(12) United States Patent
Mishra

(10) Patent No.: US 9,268,750 B2
(45) Date of Patent: Feb. 23, 2016

(54) SHARED LINK TRACKING IN ONLINE SOCIAL NETWORKING SYSTEMS

(71) Applicant: Offerpop Corporation, New York, NY (US)

(72) Inventor: Prakash Mishra, Stamford, CT (US)

(73) Assignee: Offerpop Corporation, New York, NY (US)

( * ) Notice: Subject to any disclaimer, the term of this patent is extended or adjusted under 35 U.S.C. 154(b) by 0 days.

(21) Appl. No.: 13/856,602

(22) Filed: Apr. 4, 2013

(65) Prior Publication Data

US 2013/0268829 A1    Oct. 10, 2013

Related U.S. Application Data

(60) Provisional application No. 61/620,435, filed on Apr. 4, 2012, provisional application No. 61/778,784, filed on Mar. 13, 2013.

(51) Int. Cl.
G06F 17/00       (2006.01)
G06F 17/22       (2006.01)
G06F 17/30       (2006.01)

(52) U.S. Cl.
CPC ...... G06F 17/2235 (2013.01); G06F 17/30014 (2013.01)

(58) Field of Classification Search
CPC .......... G06F 17/2235; G06F 17/30014; G06F 17/3089; G06F 17/30873
USPC .................................. 715/205, 208, 206, 207
See application file for complete search history.

(56) References Cited

U.S. PATENT DOCUMENTS

| 6,271,840 | B1 * | 8/2001 | Finseth et al. ................ 715/236 |
| 6,389,460 | B1 * | 5/2002 | Stewart et al. ................ 709/217 |
| 6,401,077 | B1 * | 6/2002 | Godden et al. ............... 705/26.8 |
| 6,456,305 | B1 * | 9/2002 | Qureshi et al. ................ 715/800 |
| 6,848,075 | B1 * | 1/2005 | Becker et al. ................. 715/205 |
| 6,864,904 | B1 * | 3/2005 | Ran et al. ....................... 715/760 |
| 7,185,284 | B2 * | 2/2007 | Teng et al. ..................... 715/738 |
| 7,243,122 | B2 * | 7/2007 | Acharya ........... G06F 17/30902 707/E17.12 |
| 7,363,291 | B1 * | 4/2008 | Page ............................. 707/706 |
| 7,617,294 | B1 * | 11/2009 | Harding ............ G06F 17/30905 370/229 |
| 7,870,253 | B2 | 1/2011 | Muilenburg |

(Continued)

OTHER PUBLICATIONS

Wilde et al., Fragment Identifiers for Plain Text Files, ACM 2005, pp. 211-213.*

(Continued)

*Primary Examiner* — Cong-Lac Huynh
(74) *Attorney, Agent, or Firm* — Robert Plotkin, P.C.; Robert Plotkin

(57) ABSTRACT

A computer-based system enables users who share content on online social networking systems to control the information that is shared in association with the shared content. For example, if a first user shares a hyperlink to content in an online social networking system with one or more other users, the user may specify the information to be shared in association with the hyperlink, such as one or more images to be shared in association with the hyperlink and a summary to be shared in association with the hyperlink. The information associated with the hyperlink may be used to create a modified hyperlink which has as its target a proxy web page containing metadata representing the data to associate with the first hyperlink. The modified hyperlink may then be shared with the other users instead of the original hyperlink.

20 Claims, 8 Drawing Sheets

(56) References Cited

U.S. PATENT DOCUMENTS

| | | | |
|---|---|---|---|
| 8,051,370 B2* | 11/2011 | Anders, Jr. | 715/205 |
| 8,064,727 B2* | 11/2011 | Lueck | 382/286 |
| 8,161,069 B1 | 4/2012 | Wilder | |
| 8,234,193 B2 | 7/2012 | Ransom | |
| 8,417,723 B1 | 4/2013 | Lissack | |
| 8,521,857 B2 | 8/2013 | Maxwell | |
| 9,047,259 B1* | 6/2015 | Ho | G06F 17/30882 |
| 2001/0007099 A1* | 7/2001 | Rau | G06Q 30/02 705/26.8 |
| 2006/0235941 A1* | 10/2006 | Arcas et al. | 709/217 |
| 2006/0242139 A1* | 10/2006 | Butterfield et al. | 707/5 |
| 2007/0143283 A1* | 6/2007 | Spencer | G06F 17/30864 |
| 2007/0198716 A1* | 8/2007 | Knowles et al. | 709/225 |
| 2007/0255747 A1 | 11/2007 | Lee | |
| 2007/0266097 A1 | 11/2007 | Harik | |
| 2008/0005072 A1 | 1/2008 | Meek | |
| 2008/0052348 A1 | 2/2008 | Adler | |
| 2009/0099901 A1* | 4/2009 | Sah | G06Q 30/02 715/209 |
| 2009/0119167 A1 | 5/2009 | Kendall | |
| 2009/0172560 A1* | 7/2009 | Cole et al. | 715/744 |
| 2009/0222322 A1 | 9/2009 | Andersen | |
| 2009/0222348 A1 | 9/2009 | Ransom | |
| 2009/0254529 A1 | 10/2009 | Goldentouch | |
| 2009/0271289 A1 | 10/2009 | Klinger | |
| 2009/0287559 A1 | 11/2009 | Chen | |
| 2009/0313304 A1* | 12/2009 | Goodger et al. | 707/104.1 |
| 2009/0327078 A1* | 12/2009 | Ohazama et al. | 705/14.54 |
| 2010/0002096 A1 | 1/2010 | Hong | |
| 2010/0004975 A1 | 1/2010 | White | |
| 2010/0042487 A1 | 2/2010 | Barazani | |
| 2010/0057840 A1* | 3/2010 | Schlusser | 709/203 |
| 2010/0064234 A1* | 3/2010 | Schreiber | G06Q 30/0273 715/760 |
| 2010/0100800 A1* | 4/2010 | Cote et al. | 715/208 |
| 2010/0145924 A1* | 6/2010 | Zabramski et al. | 707/709 |
| 2010/0153848 A1 | 6/2010 | Saha | |
| 2010/0223119 A1 | 9/2010 | Klish | |
| 2010/0228617 A1 | 9/2010 | Ransom | |
| 2010/0268584 A1 | 10/2010 | Pullur | |
| 2010/0281353 A1* | 11/2010 | Rubin | 715/208 |
| 2010/0306249 A1 | 12/2010 | Hill | |
| 2010/0332330 A1 | 12/2010 | Goel | |
| 2010/0332993 A1* | 12/2010 | Bousseton et al. | 715/738 |
| 2011/0047013 A1 | 2/2011 | McKenzie, III | |
| 2011/0060994 A1 | 3/2011 | Maxwell | |
| 2011/0078232 A1 | 3/2011 | Vandendriessche | |
| 2011/0126122 A1 | 5/2011 | Forman | |
| 2011/0131478 A1* | 6/2011 | Tock et al. | 715/208 |
| 2011/0153412 A1 | 6/2011 | Novikov | |
| 2011/0258050 A1 | 10/2011 | Chan | |
| 2011/0270959 A1* | 11/2011 | Schlusser et al. | 709/223 |
| 2011/0282735 A1 | 11/2011 | Kordis | |
| 2011/0282860 A1 | 11/2011 | Baarman | |
| 2012/0010995 A1* | 1/2012 | Skirpa et al. | 705/14.49 |
| 2012/0030553 A1 | 2/2012 | Delpha | |
| 2012/0047028 A1* | 2/2012 | Edman et al. | 705/14.73 |
| 2012/0054115 A1 | 3/2012 | Baird-Smith | |
| 2012/0109836 A1 | 5/2012 | Chen | |
| 2012/0136704 A1 | 5/2012 | Carlson | |
| 2012/0151322 A1 | 6/2012 | Lindsay | |
| 2012/0191715 A1 | 7/2012 | Ruffner | |
| 2012/0191776 A1 | 7/2012 | Ruffner | |
| 2012/0197980 A1 | 8/2012 | Terleski | |
| 2012/0210205 A1 | 8/2012 | Sherwood | |
| 2012/0210247 A1 | 8/2012 | Khouri | |
| 2012/0232998 A1 | 9/2012 | Schoen | |
| 2013/0019152 A1* | 1/2013 | Rau | 715/208 |
| 2013/0055089 A1 | 2/2013 | Gundotra | |
| 2013/0055402 A1 | 2/2013 | Amit | |
| 2013/0115911 A1 | 5/2013 | Vishwanathan | |
| 2013/0124621 A1* | 5/2013 | Lepeska et al. | 709/203 |
| 2013/0132854 A1* | 5/2013 | Raleigh et al. | 715/738 |
| 2013/0174037 A1* | 7/2013 | Gao | 715/719 |
| 2013/0179262 A1* | 7/2013 | Iwasaki | 705/14.54 |
| 2013/0246903 A1 | 9/2013 | Mukai | |
| 2013/0254643 A1* | 9/2013 | Goldman et al. | 715/205 |
| 2013/0282839 A1 | 10/2013 | Alcala | |
| 2013/0290821 A1* | 10/2013 | Pollack | 715/208 |
| 2013/0339148 A1* | 12/2013 | Sah | G06Q 30/02 705/14.54 |
| 2014/0100954 A1* | 4/2014 | Sah | G06Q 30/02 705/14.54 |
| 2014/0115095 A1 | 4/2014 | Kobyakov | |

OTHER PUBLICATIONS

Phelps et al., Robust Hyperlinks Cost just Five Words Each, Google 2000, pp. 1-12.*

Wang et al., Extending the WiKi Paradigm for Use in the Classroom, IEEE 2004, pp. 1-5.*

Schifanella et al., Folks in Folksonomies: Social Link Prediction from Shared Metadata, ACM 2010, pp. 271-280.*

Takagi et al., Social Accessibility: Achieving Accessibility through Collaborative Metadata Authoring, ACM 2008, pp. 193-200.*

"Like Button—Facebook Developers," downloaded Apr. 18, 2012, 4 pp. Available at: http://developers.facebook.com/docs/reference/plugins/like/.

"Open Graph Protocol—Facebook Developers," downloaded Jan. 9, 2012, 7 pp. Available at: http://developers.facebook.com/docs/opengraph/.

"Powerfully Simple Facebook Applications—North Social," downloaded Jan. 18, 2012, 4 pp. Available at: http://northsocial.com/apps/fan-offer/.

"Powerfully Simple Facebook Applications—North Social," downloaded Jan. 9, 2012, 14 pp. Available at: http://northsocial.com.

"Sharing Widget, Sharing Button, Sharing Plugin—ShareThis New! Share . . . ," downloaded Jan. 18, 2012, 26 pp. Available at: http://sharethis.com/publishers/new-share-widget.

Tim Ware, 3 Social Plugins for Customizing Facebook iFrame Tabs, Jun. 21, 2011.

* cited by examiner

SHARED LINK TRACKING IN ONLINE SOCIAL NETWORKING SYSTEMS

CROSS-REFERENCE TO RELATED APPLICATIONS

This application claims priority from U.S. Prov. Pat. App. Ser. No. 61/778,784, filed on Mar. 13, 2013, entitled, "Shared Link Tracking in Online Social Networking Systems"; and U.S. Prov. Pat. App. Ser. No. 61/620,435, filed on Apr. 4, 2012, entitled, "Shared Link Tracking in Online Social Networking Systems," both of which are hereby incorporated herein.

BACKGROUND

Users of online social networking systems often use such systems to transmit messages to other users and to post content to such systems for sharing with other users. For example, the Facebook social networking system provides each registered user of the system with a personal page, referred to by terms such as "wall" and "timeline," which displays a variety of information, such as personal information about the user, content posted by the user, and content posted by other users within the user's network on Facebook.

One of the primary goals of Facebook and other social networking systems is to facilitate the sharing of a wide variety of content among users in a wide variety of ways. One of the original reasons that users began using social networking systems was that they provided a convenient, user-friendly, easy way to engage in such content sharing, without requiring users to have knowledge of HTML or web programming, and without requiring users to visit different sites or use different mechanisms to share different kinds of content with other users.

For example, if a user of Facebook views content on any web site that the user wishes to share with other Facebook users, such as an article, a photograph or photo gallery, or an online coupon or promotion, the user may share a link to the content with other users. When the sharing user uses Facebook to share the link, Facebook gathers and generates information about the link that is shared, by analyzing the web page at the link address (URL), including images from the page located at that address, and a summary of that page. When recipients of the shared link view the link in Facebook, Facebook displays the link and some or all of the associated information, such as the associated image and summary. This provides more information to the receiving user than would be provided by a bare URL, thereby enabling the receiving user to understand the context and meaning of the linked information more easily than if a mere bare URL had been displayed. Furthermore, the presentation of an image and summary acts as a preview of the linked web page, and influences the receiving user's decision about whether it is worthwhile to navigate to the shared link. The preview has a substantial impact on the click-through rate (CTR) of the link, and as a result, the preview may have a direct commercial impact on the web content being linked. Facebook determines what to present in the preview by applying certain rules and algorithms on the linked web page. Because this preview is statically determined by the content of the linked page and private algorithms determined by Facebook, customizing the preview based on business goals or dynamically based on the targeted audience may be impractical or impossible. While this example refers to Facebook, Twitter and other social networks treat shared links in a similar way. The proprietary and confidential algorithms each social network applies to generate previews of linked content vary, adding to the difficulty of customizing previews of linked content.

What is needed, therefore, are improved techniques for sharing content in online social networking systems.

SUMMARY

A computer-based system enables users who share content on online social networking systems to control the information that is shared in association with the shared content. For example, if a first user shares a hyperlink to content in an online social networking system with one or more other users, the user may specify the information to be shared in association with the hyperlink, such as one or more images to be shared in association with the hyperlink and a summary to be shared in association with the hyperlink. The information associated with the hyperlink may be used to create a modified hyperlink which has as its target a proxy web page containing metadata representing the data to associate with the first hyperlink. The modified hyperlink may then be shared with the other users instead of the original hyperlink. When the online social networking system displays the modified hyperlink to the other users, the online social networking system may display the information associated with the modified hyperlink.

DETAILED DESCRIPTION

A computer-based system enables users who share content on online social networking systems to control the information that is shared in association with the shared content. For example, if a first user shares a hyperlink to content in an online social networking system with one or more other users, the user may specify the information to be shared in association with the hyperlink, such as one or more images to be shared in association with the hyperlink and a summary to be shared in association with the hyperlink. The information associated with the hyperlink may be embedded within the hyperlink to create a modified hyperlink. The modified hyperlink may then be shared with the other users instead of the original hyperlink. When the online social networking system displays the modified hyperlink to the other users, the online social networking system may display the information associated with the modified hyperlink.

Figure 1:
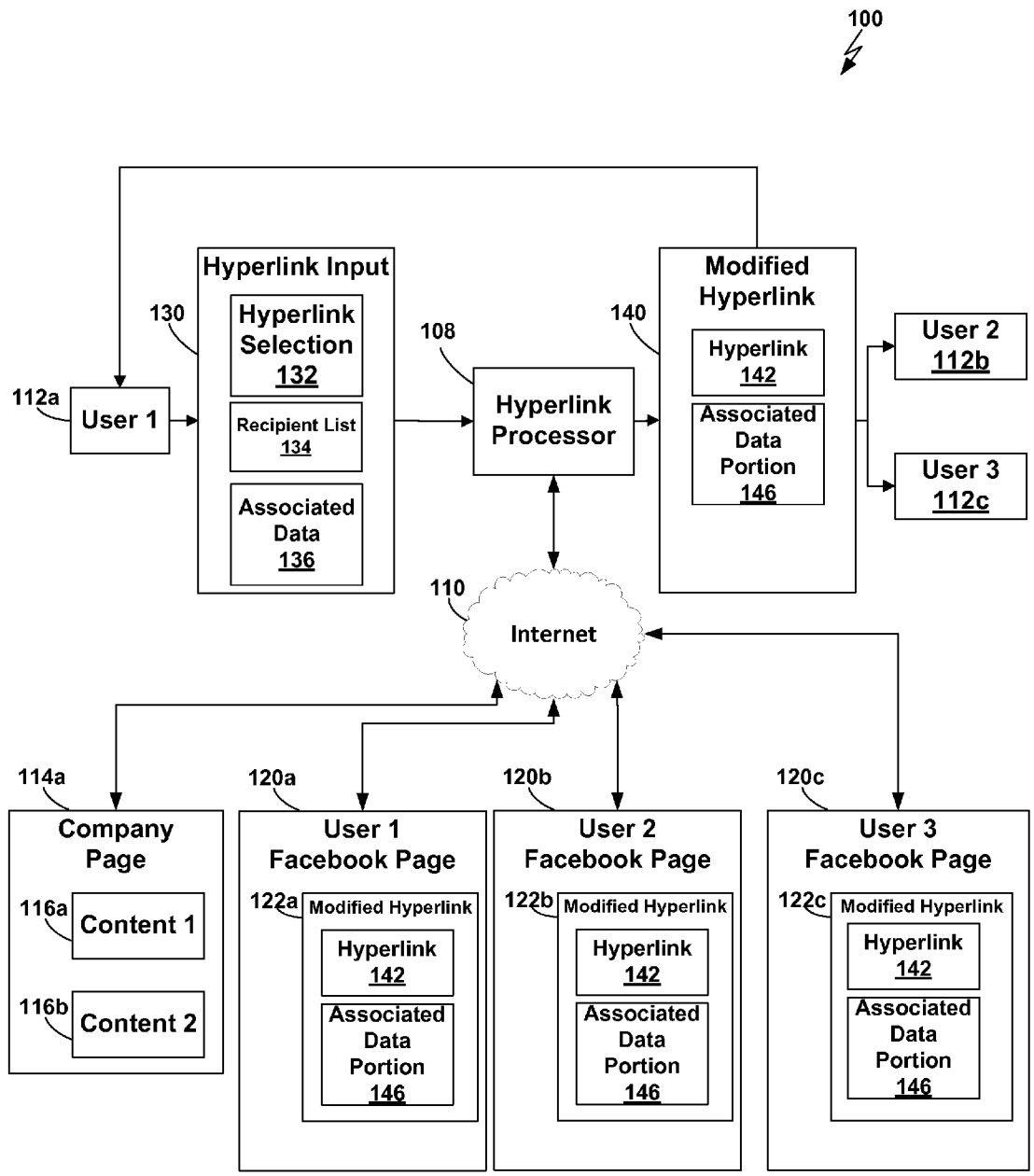
FIG. 1 is a dataflow diagram of a system for sharing content in online social networking systems according to one embodiment of the present invention.

Referring to FIG. 1, a diagram is shown of a system 100 implemented according to one embodiment of the present invention. In general, the system 100 of FIG. 1 enables users of an online social networking system, such as Facebook, to share hyperlinks with each other and to control the information that is associated with the shared hyperlinks and displayed in connection with the shared hyperlinks when the shared hyperlinks are displayed to the users with whom they are shared.

More specifically, consider the example of FIG. 1, in which a company (referred to herein as "Company A") is associated with a page 114a, which contains content 116a and content 116b. Although only one page 114a is shown in FIG. 1 for ease of illustration, the system 100 may include any number of pages, which may be associated with one or more companies. The page 114a may, for example, be a web page, or a social networking page, such as a page on Facebook or any other online social networking system. Furthermore, although only one company page 114a is shown in FIG. 1, a company may be associated with pages on any number of online social networks (e.g., zero, one, two, or more). Similarly, the particular number of contents 116a-b shown in FIG. 1 is merely an example and not a limitation of the present invention.

Furthermore, although element 114a is labeled as a "page" in FIG. 1, this is merely an example and does not constitute a limitation of the present invention. As another example, element 114a may be a subset of a page (e.g., a subset of a web page or a social networking page). As yet another example, element 114a may be any form of content contained within Facebook or another online social networking system. Even more generally, element 114a may be any web page or other resource that is addressable by a URL, whether or not such a resource is contained within or otherwise related to an online social networking system. For ease of explanation, element 114a will be described herein as a "shared page."

Although the shared page 114a is illustrated in FIG. 1 as being owned by, created by, maintained by, or otherwise associated with a "company," this is merely an example and does not constitute a limitation of the present invention. More generally, the shared page 114a may be owned by, created by, maintained by, or otherwise associated with any user or set of users, including users who are individuals rather than companies or other organizations. Therefore, any reference herein to a "company" should be understood to refer more generally to any entity, such as a for-profit or non-profit organization, or an individual person.

A user of an online social networking site may use the system 100 of FIG. 1 to share hyperlinks to content within an online social networking system (such as Facebook) with other users of the online social networking system. For example, user 112a may use the system 100 to share a hyperlink to content 116a within shared page 114a with user 112b and/or user 112c.

Consider an example in which user 112a wishes to share a hyperlink to content 116a with user 112b. Content 116a may be any kind of content hosted on the Internet, such as a web page, advertisement, photograph, coupon, or promotion. The content 116a may itself be a hyperlink, in which case the user 112a wishes to share the hyperlink itself with user 112b. The user 112a may or may not be the owner of the shared page 114a.

Figure 5:
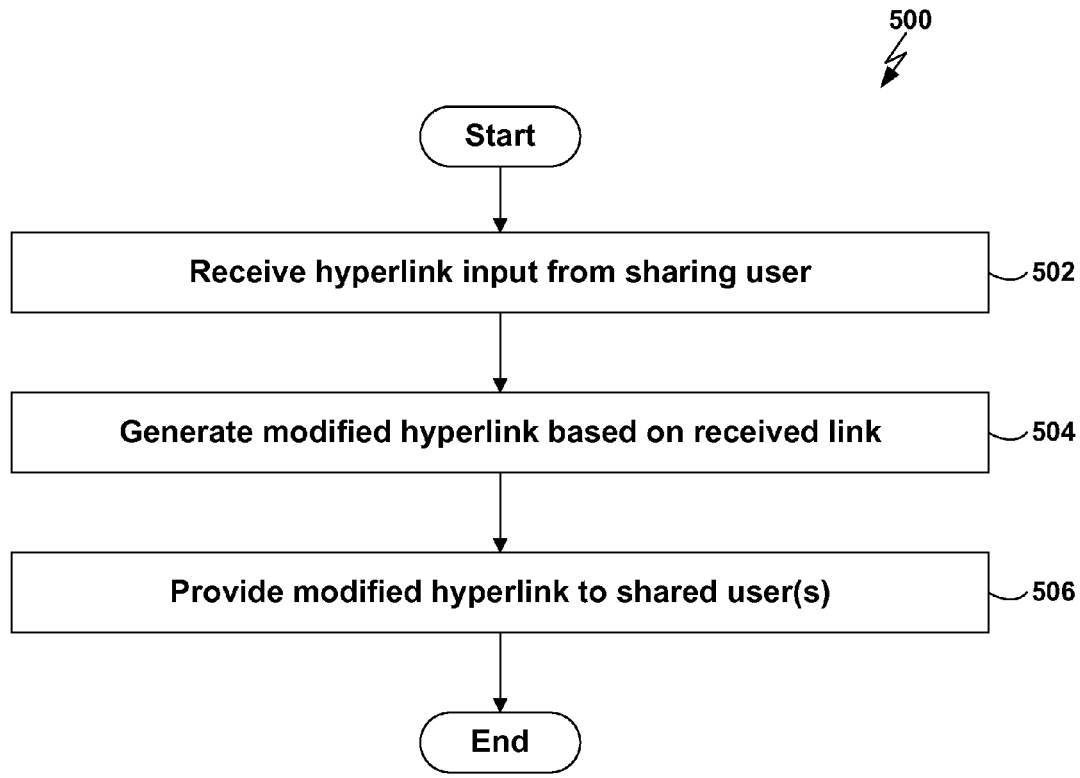
FIG. 5 is a flowchart of a method performed by the system of FIG. 1 according to one embodiment of the present invention.

Referring to FIG. 5, a flowchart is shown of a method 500 for sharing hyperlinks according to one embodiment of the present invention. The user 112a may provide input 130 to the system 100, where the input 130 contains selection data 132 that specifies the content for which the user 112a intends to share a hyperlink. For example, if the user 112a intends to share a hyperlink to content 116a, then the hyperlink selection data 132 may point to, contain an identifier of, or otherwise specify the content 116a. For example, the hyperlink selection data 132 may be a URL or other address of the content 116a. Alternatively, for example, the hyperlink selection data 132 may be data that identifies the content 116a, in response to which the hyperlink processor 108 may generate a URL of the content 116a based on the hyperlink selection data 132.

The input 130 provided by the user 112a may also contain a recipient list 134, which may be data that identifies one or more users with whom the sharing user (e.g., user 112a) wishes to share the content that is specified by hyperlink selection data 132 (e.g., content 116a). For example, the recipient list 134 may contain one or more email addresses, Facebook IDs (or IDs of users in other social networking systems), or other identifiers of the desired recipients. In the present example, assume that the recipient list 134 contains data specifying users 112b and 112c as recipients.

The input 130 provided by the user 112a may also contain associated data 136. The associated data 136 may include any data that the user 112a desires to be associated with the shared hyperlink when the hyperlink is shared with the recipients of the hyperlink (as specified by the recipient list 134). For example, the associated data 136 may include any one or more of the following: one or more images, one or more videos, one or more text strings, and one or more advertisements.

The hyperlink input 130 is received by a hyperlink processor 108 (FIG. 5, operation 502). The hyperlink processor 108 may be implemented in any manner. For example, the hyperlink processor 108 may be:

implemented as client-side or server-side code in a web page (such as JavaScript);
integrated into an online social networking system (such as Facebook);
implemented as a plugin to or application running on an online social networking system;
implemented as a plugin to a web browser; or
implemented as a standalone application, such as a client-side or server-side application.

In general, the hyperlink processor 108 generates a modified hyperlink 140 which contains both a hyperlink portion 142 and associated data portion 146 (FIG. 5, operation 504). The hyperlink portion 142 is an example of a "content portion" as that term is used herein, because the hyperlink portion 142 may point to the content 116a shared by the sharing user 112a, or a web page or other data structure containing the content 116a. For example, the hyperlink 142 may be the hyperlink specified by the hyperlink selection 132, or a hyperlink generated based on the hyperlink selection 132. As mentioned above, existing online social networking systems, such as Facebook, enable users to share hyperlinks with each other. The hyperlink portion 142 of the modified hyperlink 140 may be a hyperlink of the kind typically generated by an existing online social networking system, such as Facebook.

The associated data portion 146 may be any data, generated based on the associated data 136 provided by the sharing user 112a, which represents some or all of the associated data 136. For example, the associated data portion 146 in the modified hyperlink 140 may be a copy of some or all of the associated data 136 provided by the sharing user 112a, or may be data that differs from some or all of the associated data 136 provided by the sharing user 112a but nevertheless generated based on the associated data 136.

For example, if the sharing user 112a specified, via the associated data 136, the desire to associate the hyperlink portion 142 with a particular image from the page 114a that contains the shared content 116a, then the associated data portion 146 may contain the particular image and/or an identifier of the particular image. As another example, if the sharing user 112a specified, via the associated data 136, a text string representing a summary of the shared content 116a, then the associated data portion 146 may contain the text string or an identifier of the text string.

The modified hyperlink 140 may, for example, be implemented as a URL in which the hyperlink 142 is implemented within the server name, domain name, port number, path, and fragment identifier portions of the URL (e.g., "http://www.xyz.com/page.html" or "http://www.xyz.com/page.html#content") and in which the associated data portion 146 is represented by a query string and optionally a fragment identifier embedded within the URL (e.g., "?image=image123&summary=HungerGames"). In this particular example, the associated data portion 146 is appended to the hyperlink. Furthermore, in this particular example, the text "image=image123" specifies an image within the associated data portion 146 and the text "summary=HungerGames" specifies a summary within the associated data portion 146. In another embodiment, the modified hyperlink 140 may be implemented as a unique short URL, where the short URL is redirected to a proxy server, that looks up the hyperlink 142 and associated data portion 146, and performs the needed processing.

The hyperlink processor 108 may provide the modified hyperlink 140 to the user(s) specified by the recipient list 134, or otherwise cause the modified hyperlink 140 to be provided to those users (FIG. 5, operation 506). In the example of FIG. 1, the hyperlink processor 108 provides the modified hyperlink 140 to users 112b and 112c (i.e., the recipients specified in the recipient list 134).

Additionally or alternatively, the hyperlink processor 108 may provide the modified hyperlink 140 to the user who provided the hyperlink input 130 to the hyperlink processor 108. For example, as shown in FIG. 1, the hyperlink processor 108 may provide the modified hyperlink 140 to user 112a.

The hyperlink processor 108 may provide the modified hyperlink 140 to users (e.g., the recipients and/or the originating user) in any of a variety of ways. For example, the hyperlink processor 108 may provide the modified hyperlink 140 to users within an email message, text message, web page text, social networking message, or other message transmitted over the Internet 110 or other network. Additionally or alternatively, the hyperlink processor 108 may provide the modified hyperlink 140 to the recipients by posting the hyperlink 140 on the social networking pages (e.g., Facebook walls or timelines) of the recipients. For example, in the system 100 of FIG. 1, the hyperlink processor 108 has posted copies of the modified hyperlink 140 to the Facebook page 120b of user 112b as modified hyperlink 122b and to the Facebook wall 120c of user 112c as modified hyperlink 122c. As illustrated therein, both modified hyperlink 122b and modified hyperlink 122c contain copies of and/or links to the hyperlink 142 and the associated data portion 146.

As another example, any of the recipients of the hyperlink (e.g., user 112a, user 112b, and/or user 112c) may post the hyperlink to his or her Facebook page. FIG. 1 shows an example in which user 112a has posted a copy 122a of the modified hyperlink 140 to user 112a's Facebook page 120a, in which user 112b has posted a copy 122b of the modified hyperlink 140 to user 112b's Facebook page 120b, and in which user 112c has posted a copy 122c of the modified hyperlink 140 to user 112c's Facebook page 120c.

Figure 6:
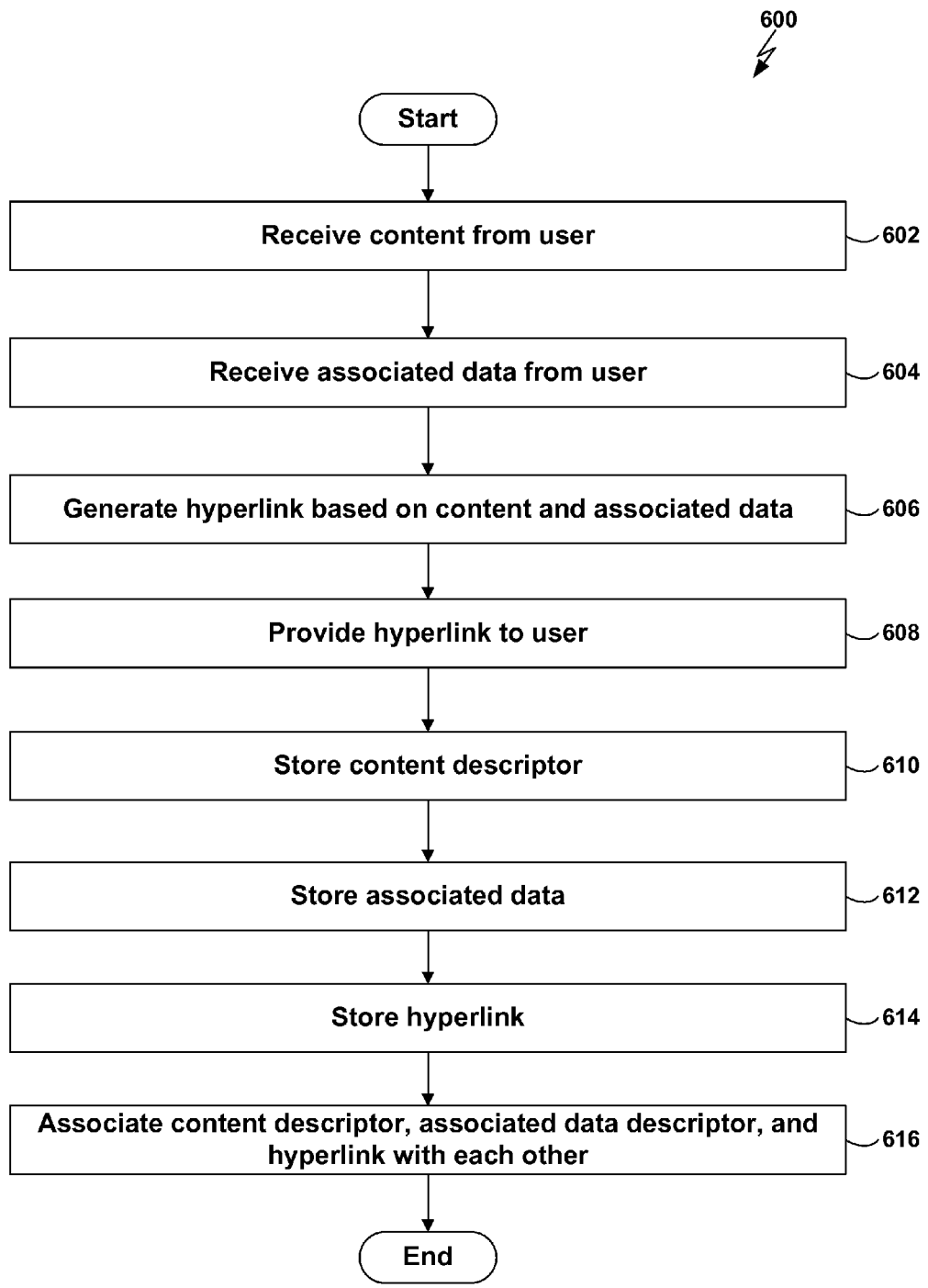
FIG. 6 is a flowchart of a method performed by the system of FIG. 2 according to one embodiment of the present invention.

Embodiments of the present invention may operate in ways other than those illustrated in FIG. 1. For example, referring to FIG. 2, a dataflow diagram is shown of a system 200 for generating hyperlinks according to another embodiment of the present invention. Referring to FIG. 6, a flowchart is shown of a method 600 that is performed by the system 500 of FIG. 5 according to one embodiment of the present invention.

A user, such as user 112a, provides both content 116a and associated data 136 to a content server 202, which receives both the content 116a and the associated data 136 (FIG. 6, operations 602 and 604). The content 116a may be any kind of content disclosed herein. For example, the content 116a may include at least one of text, an image (e.g., a digital photograph), an audio file, and a video file. As another example, the content 116a may be a hyperlink to any resource accessible via the Internet, such as a web page, an image, an audio file, or a video file. The associated data 136 may be of any of the kinds disclosed herein, such as one or more images, one or more videos, one or more text strings, and one or more advertisements.

The content server 204 generates a hyperlink 210 based on the content 116a and the associated data 136 (FIG. 6, operation 606). The hyperlink 210 may point to one or more of the following: (1) the content 116a; (2) content derived from the content 116a (such as a web page containing the content 116a or a copy of the content 116a); (3) the associated data 136; or (4) data derived from the associated data. The hyperlink 210 may, for example, have any of the properties disclosed herein for the modified hyperlink 140 of FIG. 1. In particular, the hyperlink 210 may include both a content portion representing the content descriptor 206 (such as a URL of or other pointer to the content descriptor 206) and an associated data portion representing the associated data descriptor 208 (such as Open Graph Protocol meta tags representing the associated data descriptor 208).

The content server 204 provides the hyperlink 210 to the user 112a (FIG. 6, operation 608). The user 112a may then perform any of the actions on the hyperlink 210 as disclosed herein in connection with the modified hyperlink 140 of FIG. 1. For example, the user 112a may post the hyperlink 210 on his or her Facebook page 120a, post the hyperlink 210 on a web page (i.e., a web page that is not on Facebook or any other social networking site), or share the hyperlink 210 with one or more other users (e.g., users 120b and 120c).

The content server 202 may also generate and store a descriptor 206 of the content 116a in a content store 204 (FIG. 6, operation 610). The content descriptor 206 may, for example, be a copy of the content 116a, content derived from the content (such as a thumbnail of an image if the content 116a is an image), or a hyperlink to the content 116a. The content store 204 may also generate and store associated data descriptor 208, which may, for example, be a copy of the associated data 136, data derived from the associated data 136, or a hyperlink to the associated data 136 (FIG. 6, operation 612). The associated data descriptor 208 may be any data, generated based on the associated data 136 provided by the sharing user 112a, which represents some or all of the associated data 136. The content server 202 may also store the hyperlink 210 (FIG. 6, operation 614).

Figure 2:
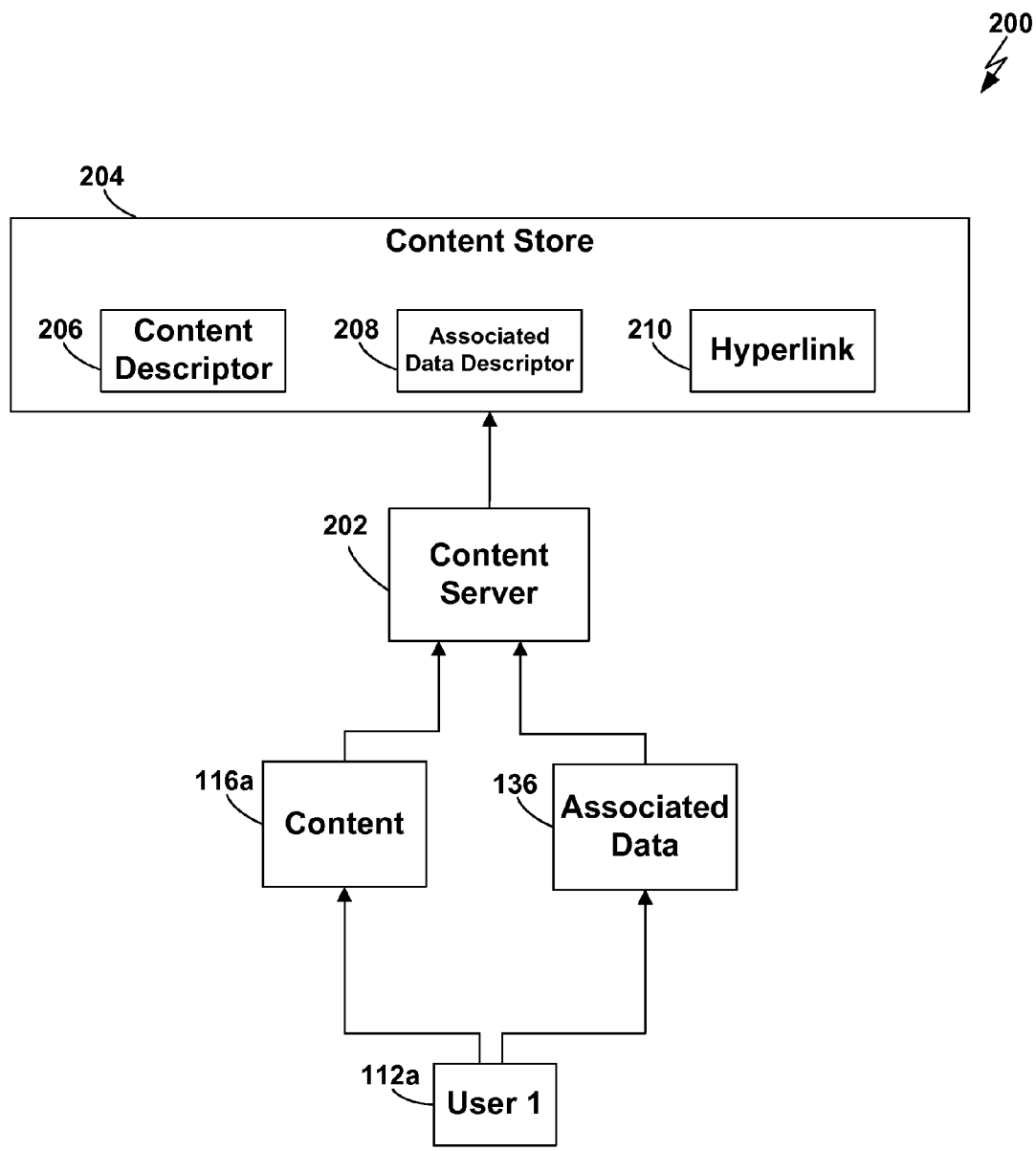
FIG. 2 is a dataflow diagram of a system 200 for generating hyperlinks according to one embodiment of the present invention.

The content server 202 may associate the content descriptor 206, associated data descriptor 208, and hyperlink 210 with each other (FIG. 6, operation 616). For example, the content server 202 may store the content descriptor 206, associated data descriptor 208, and hyperlink 210 in a single database record. More generally, the content server 202 may store any associations among the content descriptor 206, the associated data descriptor 208, and the hyperlink 210 which enable any one of them to be identified based on another one of them. Although only one set of content descriptor 206, associated data descriptor 208, and hyperlink 210 are shown in FIG. 2 for purposes of example, the content server 202 may generate and store additional similar sets of data in response to the user 112a and/or other users providing additional content and associated data to the content server 202.

The content server 202 and/or content store 204 may, for example, be functionally independent of a social networking site, such as Facebook. For example, the content server 202 may be neither owned nor operated by Facebook or any other social networking site. Similarly, the content store 204 may be neither owned nor operated by any social networking site, such as Facebook. For example, in one embodiment of the present invention, the content descriptor 206 (e.g., a copy of the content 116a) is stored and otherwise maintained by the server of a social networking site, such as Facebook, while the associated data descriptor 208 and/or hyperlink 210 are not stored or otherwise maintained by the server of the social networking site, and the content server 202 is functionally independent of the server of the social networking site. For example, the content server 202 and/or content store 204 may be located at a different physical machine, virtual machine, and/or IP address than the server of the social networking site.

The target of the hyperlink 210 may, for example, be one or both of the content descriptor 206 and the associated data descriptor 208. For example, in one particular embodiment, the associated data descriptor 208 is implemented as a proxy web page which contains metadata representing the associated data 136, such as in the form of Open Graph Metadata tags. Such a proxy web page may, for example, contain the metadata representing the associated data 136 but not the content descriptor 206 or the content 116a. For example, if the content descriptor 206 is a photograph or a link to a photograph, then the metadata representing the associated data 136 may be Open Graph Metadata tags representing a caption of the photograph. In this embodiment, the target of the hyperlink 210 is the proxy web page that contains the metadata (e.g., the Open Graph Metadata tags).

Embodiments of the present invention may manifest hyperlinks generated by such embodiments (such as hyperlink 140 and hyperlink 210) in any of a variety of ways. The term "manifest" as used herein refers to generating output that represents the hyperlink, such as visual and/or auditory output. For example, manifesting the hyperlink 140 or 210 (or copies thereof, or hyperlinks derived therefrom) may include any one or more of the following: displaying anchor text of the hyperlink, displaying the URL of the target of the hyperlink, displaying one or more images specified by the associated data of the hyperlink (e.g., associated data portion 146 or associated data descriptor 208), and playing one or more multimedia files specified by the associated data of the hyperlink. Additionally or alternatively, manifesting a hyperlink may include generating and outputting sounds representing the hyperlink, such as generating and outputting synthetic speech representing the URL of the target of the hyperlink.

Figure 3:
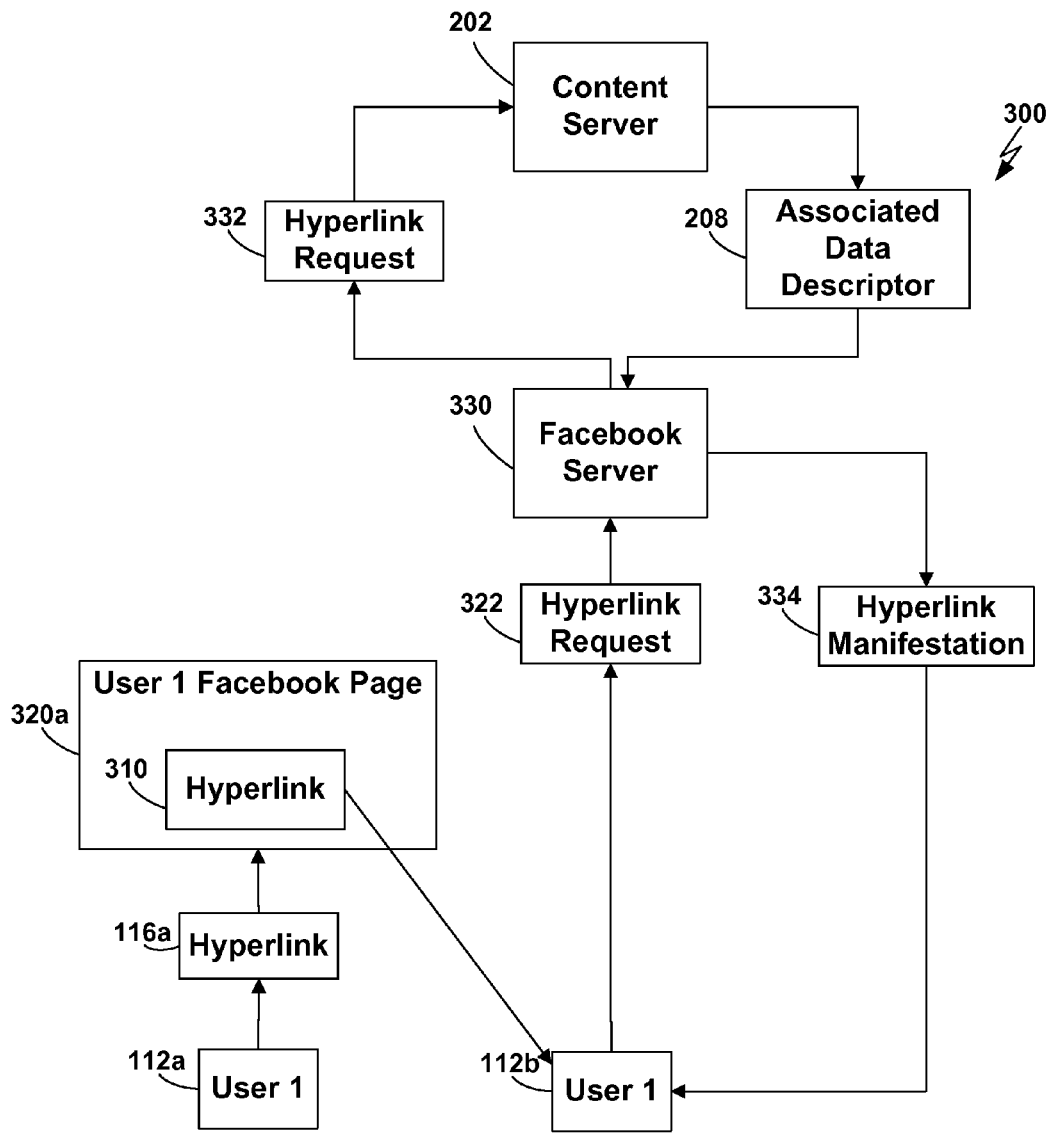
FIG. 3 is a dataflow diagram of a system for manifesting a hyperlink according to one embodiment of the present invention.
Figure 7:
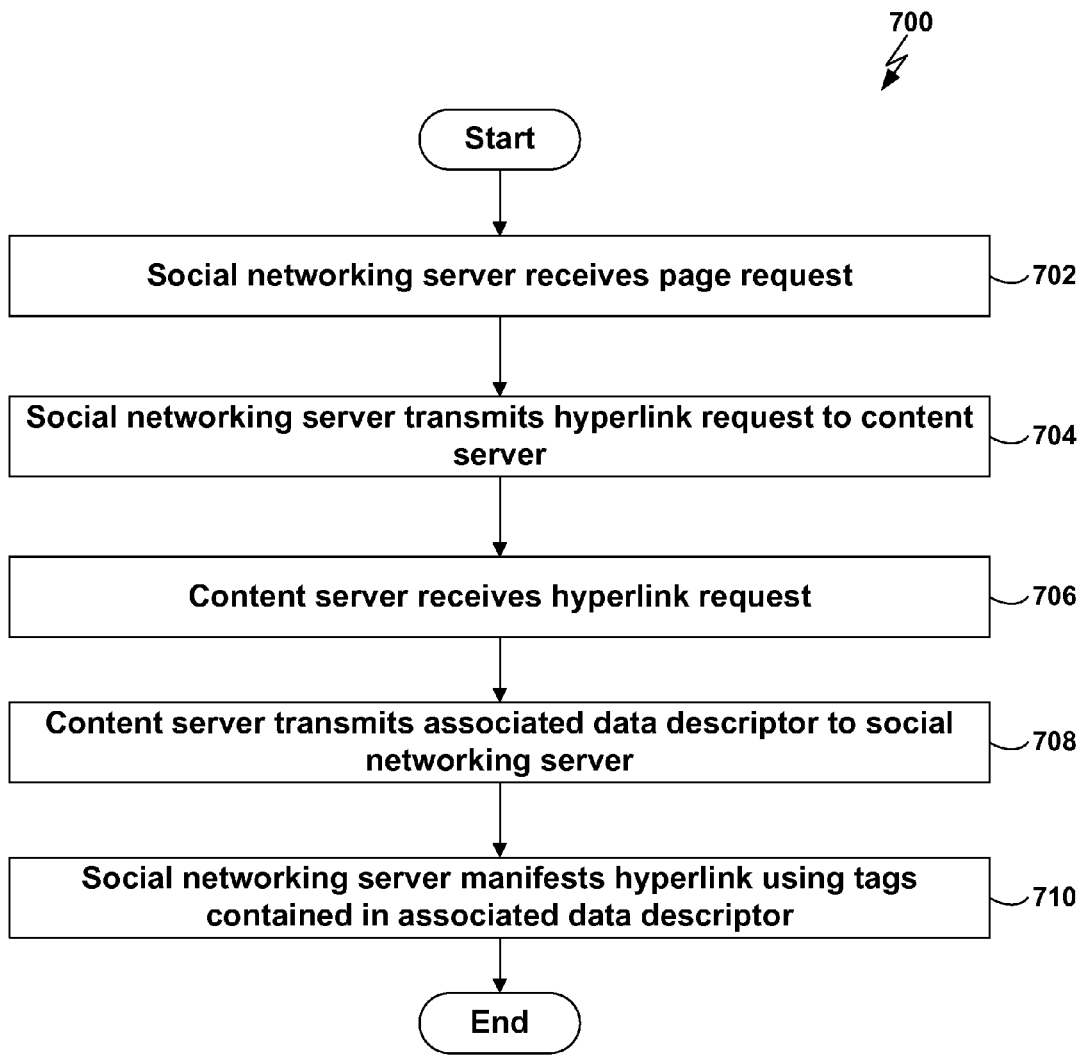
FIG. 7 is a flowchart of a method performed by the system of FIG. 3 according to one embodiment of the present invention.

Referring to FIG. 3, a dataflow diagram is shown of a system 300 for manifesting the hyperlink 210 according to one embodiment of the present invention. Referring to FIG. 7, a flowchart is shown of a method 700 performed by the system 300 of FIG. 3 according to one embodiment of the present invention.

It should be appreciated that although the techniques of FIGS. 3 and 7 are described as being applied to the hyperlink 210 of FIG. 2, the same techniques may be applied equally to the modified hyperlinks 140 and 122a-c of FIG. 1. In fact, the hyperlink 210 of FIG. 2 may be implemented in any of the ways described herein for the modified hyperlink 140 of FIG. 1, and vice versa.

The user 112a may share the hyperlink 210 with other users in any of the way disclosed herein, such as by posting the hyperlink 210 on user 112a's social networking site page, which is shown in FIG. 3 as Facebook page 320a for purposes of example. In FIG. 3, the user 112a is shown as having posted a copy 310 of the hyperlink 210 on the user 112a's Facebook page 320a.

When another user, such as user 112b, navigates to user 112a's Facebook page 320a, the user 112b's computing device (not shown) transmits a request 322 to the social networking server that serves the page 320a (e.g., Facebook server 330) for the page 320a. Facebook server 330 receives the request 322 (FIG. 7, operation 702) and, in the process of processing the request 322, encounters the hyperlink 310 within the page 320a. In response to encountering the hyperlink 310, the Facebook server transmits a request 332 for the target of the hyperlink 332 to content server 202 (FIG. 7, operation 704). The request 332 may, for example, be an HTTP request for the resource specified by the hyperlink 310 (i.e., the target of the hyperlink 310), such as an HTTP GET request. Content server 202 receives the request 332 (FIG. 7, operation 706) and, in response, transmits the associated data descriptor 208 (e.g., the proxy web page containing the associated data descriptor 208) to the Facebook server 330 (FIG. 7, operation 708).

In response to receiving the associated data descriptor 208, the Facebook server 330 determines whether the associated data descriptor 208 contains any Open Graph Metadata tags. If the Facebook server 330 determines that the associated data descriptor 208 contains Open Graph Metadata tags, then the Facebook server 330 uses those tags to manifest (e.g., display) the hyperlink 310 to the user 112b in accordance with the tags, thereby creating a manifestation 334 of the link 310 (FIG. 7, operation 710). For example, if the associated data descriptor 208 includes tags that specify a thumbnail image of the content 116a and a caption for the content 116a, then the Facebook server 330 uses those tags to render the thumbnail image and the caption to the user 112b in the link manifestation 334. The Facebook server 330 may, for example, use the tags to retrieve the thumbnail image (which may be stored, for example, in the context descriptor 206 in the content store 204) and then manifest the retrieved thumbnail image. In this way, the content server 202 enables the user 112a to specify how the hyperlink 310 will be manifested to the user 112b when the Facebook server 330 manifests the hyperlink 310 to the user 112b.

Figure 4:
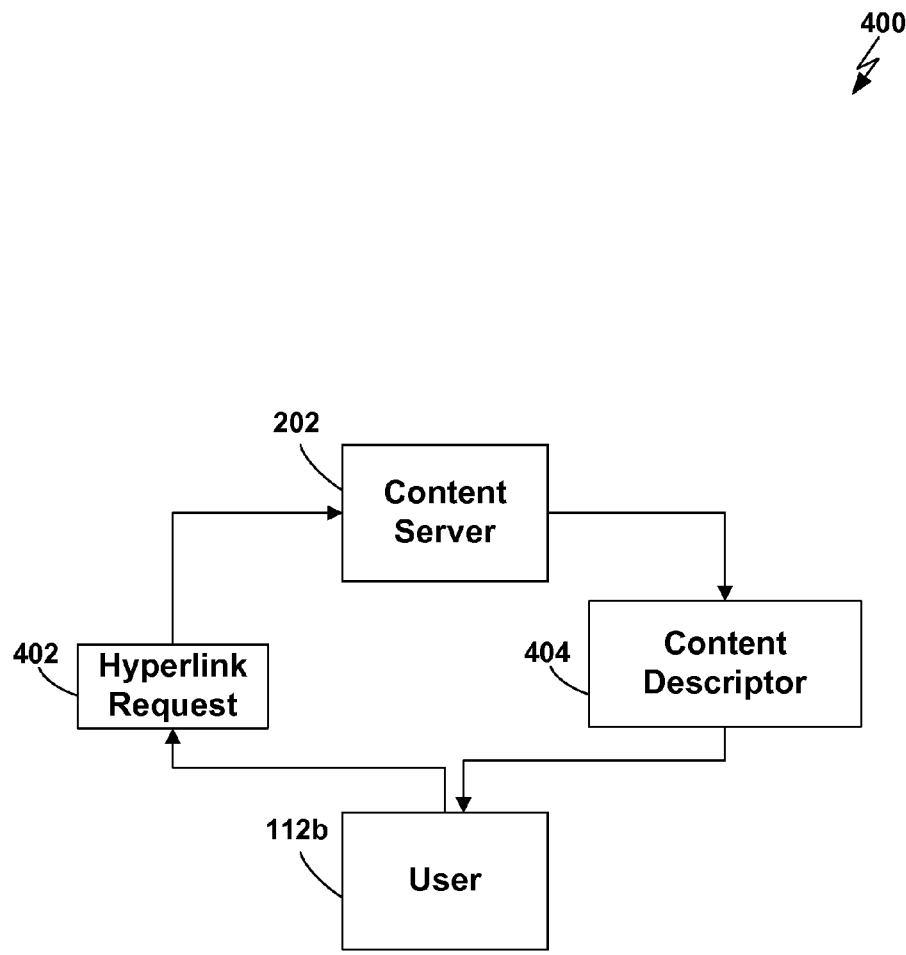
FIG. 4 is a dataflow diagram of a system for manifesting the target of a hyperlink according to one embodiment of the present invention.
Figure 8:
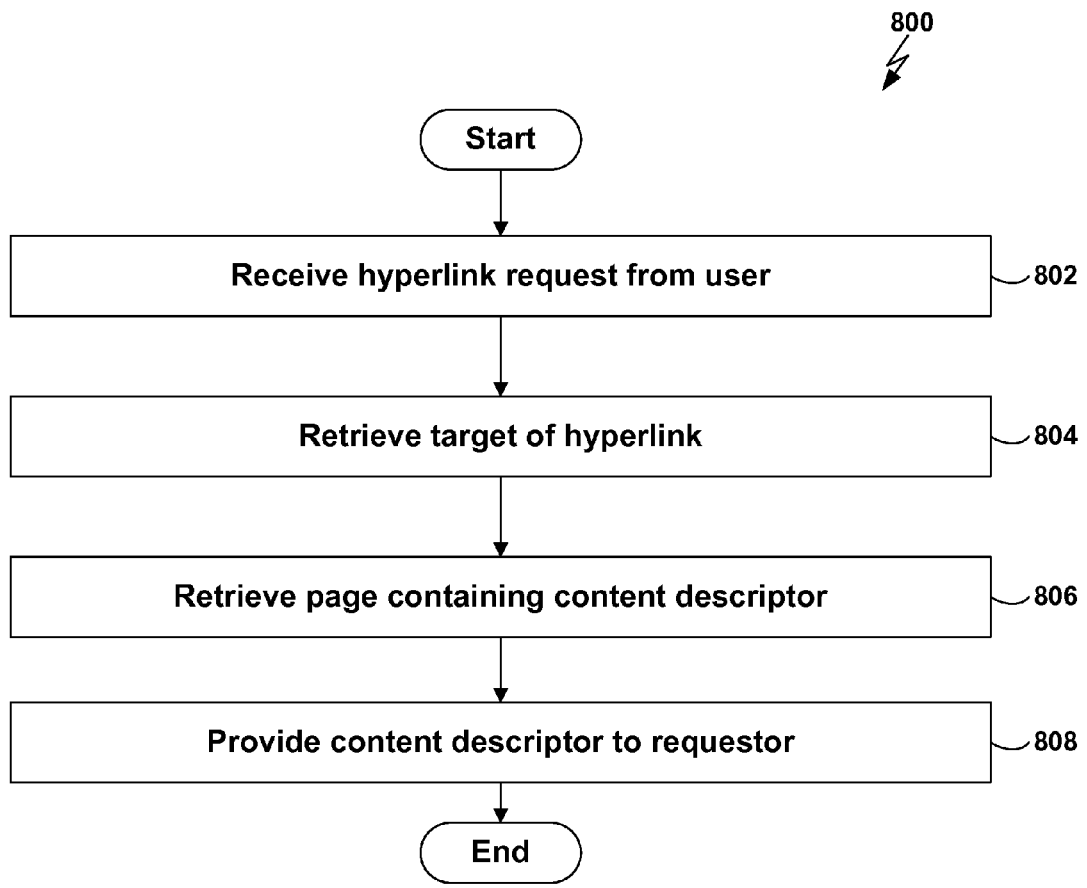
FIG. 8 is a flowchart of a method performed by the system of FIG. 4 according to one embodiment of the present invention.

Embodiments of the present invention may also perform any of a variety of actions when a user clicks on or otherwise selects the hyperlink 210 and thereby issues a command to navigate to the target of the hyperlink 210 (or a copy of the hyperlink 210 or any hyperlink derived from the hyperlink 210, such as hyperlink 310). For example, referring to FIG. 4, a dataflow diagram is shown of a system 400 for manifesting the target of the hyperlink 210 according to one embodiment of the present invention. Referring to FIG. 8, a flowchart is shown of a method 800 performed by the system 400 of FIG. 4 according to one embodiment of the present invention.

A user, such as user 112b, issues a request 402 to the content server 202 to navigate to the target of the hyperlink 210. The user 112 may issue the request 402 in any of a variety of ways, such as by clicking on or otherwise selecting a manifestation of the hyperlink 310 in user 112a's Facebook page 320a, in user 112b's Facebook page 120b, in a non-Facebook web page (i.e., in a web page not hosted by any social networking site), or in an email message or other electronic message. The server portion of the target of the hyperlink 310 may specify the content server 202, thereby causing the user 112b's web browser to transmit the request 402 to the content server 202 in response to the user 112b selecting the manifestation of the hyperlink 310.

In response to receiving the request 402, the content server 202 may retrieve the target of the hyperlink 210, e.g., the proxy web page mentioned above (FIG. 8, operation 804). As mentioned above, the target of the hyperlink 210 may be a proxy web page containing the associated data descriptor 208. Such a web page may be designed to cause the content server 202 to immediately redirect the requester (e.g., the web browser of user 112b) to a web page containing the content descriptor 206 and/or content described by the content descriptor 206 (e.g., the content 116a) (FIG. 8, operation 806). In other words, the content server 202 may, in response to receiving the hyperlink request 402, first retrieve the proxy web page and then, in response to retrieving the proxy web page, retrieve the content descriptor 206. For example, the content descriptor 206 may be implemented as a web page containing the content 116a (e.g., a digital photograph) or content derived from the content 116a (e.g., a thumbnail of the digital photograph). Therefore, in response to receiving the request 402 from the user 112b's web browser to navigate to the target of the hyperlink 210, the content server 202 may retrieve the associated data descriptor 208 and (optionally) provide the associated data descriptor 208 to the user 122b. The content server 202 may then immediately retrieve the web page containing or consisting of the content descriptor 206 (FIG. 8, operation 806). The content server 202 may then provide a content descriptor 404 (which may be a copy of the content descriptor 206 or data derived from the content descriptor 206) to the user 122b (FIG. 8, operation 808). Note that the content server 202 may, therefore, retrieve the associated data descriptor 208 and the content descriptor 206, and provide the content descriptor 206 but not the associated data descriptor 208 to the user 122b.

In a particular example in which the content descriptor 404 is a web page, in response to the user 112b clicking on a manifestation of the hyperlink 310, the user 112b's web browser may receive the content descriptor 404 web page from the content server 202 and then render that web page to render the content 116a (e.g., digital photograph) to the user 112b.

Because every request for the target of the hyperlink 210 is transmitted to and received by the content server 202, the content server 202 may store a record of each such request, and thereby count the number of such requests, and store a record of such a count. More generally, for each request for a hyperlink stored in the content store 204 (such as hyperlink 210 and any other hyperlinks stored in the content store 204), the content server 202 may store any of a variety of information, such as any one or more of the following: (1) an identifier of the requested hyperlink; (2) data identifying the requester (e.g., IP address, social networking site (e.g., Facebook) ID), email address); and (3) a time at which the request was received. The content server 202 may generate and store, based on such data, any of a variety of metrics, such as the total number of requests received for a particular hyperlink from all requesters, the total number of times all hyperlinks generated by a particular user (e.g., user 112a) have been requested by all other users, and the total number of requests received from a particular user (e.g., user 112b) for all hyperlinks.

Although certain embodiments are described herein as being applied to a single online social networking system, such as Facebook, this is merely an example and does not constitute a limitation of the present invention. Alternatively, for example, the system 100 may enable a single modified hyperlink, such as modified hyperlink 140, to be shared across a plurality of online social networking systems to perform any of the functions disclosed herein.

Embodiments of the present invention have a variety of advantages. For example, embodiments of the present invention enable the user who shares a hyperlink in an online social networking system to control how that hyperlink appears when recipients of the hyperlink view the hyperlink. This differs from the behavior of existing online social networking systems, which do not provide the user who shares a hyperlink with control over how that hyperlink appears when it is shared. For example, when a user shares a hyperlink using Facebook, Facebook dictates the information that is displayed when the hyperlink is shared. In contrast, embodiments of the present invention enable the user to specify content, such as images and/or text, to be displayed in connection with the hyperlink when it is viewed by users with whom it has been shared. The default content selected by Facebook for display in connection with a particular hyperlink may not be particularly informative or useful. For example, Facebook may select the first or largest image on a shared page to display in connection with a shared hyperlink even though that image is not the most relevant or informative image on the page. In contrast, embodiments of the present invention enable the sharing user to select the image to be displayed in connection with the shared hyperlink. As a result, the sharing user may ensure that the most relevant image, or that the image having some other desirable feature, is displayed in connection with the hyperlink when it is shared.

Another benefit of embodiments of the present invention is that they need not require the creator of the shared hyperlink to modify the hyperlink to enable it to be shared in the ways described herein. Instead, for example, embodiments of the present invention may be applied to conventional hyperlinks in existing social networking site pages. Such hyperlinks, in other words, need not be changed before embodiments of the present invention may be applied to them. More generally, the creators of those hyperlinks need not take any special steps to enable embodiments of the present invention to be applied to those hyperlinks. Embodiments of the present invention therefore facilitate the sharing of hyperlinks in the ways described herein.

Yet another benefit of embodiments of the present invention is that they facilitate the generation of modified hyperlinks, such as the modified hyperlink 140. For example, the system 100 enables the user 112a to generate the modified hyperlink 140 merely by specifying the hyperlink to be shared (e.g., hyperlink 116a), the recipients of that hyperlink, and the data (e.g., image and/or text) to be displayed in connection with that hyperlink. In response, the system 100 automatically generates the modified hyperlink 140 using the techniques disclosed herein. The user 112a need not know how to modify the original hyperlink to generate the modified hyperlink 140. For example, the user 112a need not know how to embed query strings into HTML code. As a result, embodiments of the present invention may be used by users without programming knowledge to share customized hyperlinks with each other.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The description herein refers to certain online social networking systems, such as Facebook and Twitter, merely for purposes of example. Embodiments of the present invention are not limited to use in conjunction with these particular online social networking systems, but instead may be used in conjunction with any one or more online social networking systems. More generally, embodiments of the present invention may be used in conjunction with any online system for hosting content, such as any web site. Therefore, any reference herein to an "online social networking system" should be understood to refer more generally to any online system for hosting content, whether or not such a system includes social networking features.

Any reference herein to a "Facebook server" should be understood to refer more generally to any server of any online social networking system, such as Facebook, LinkedIn, or Twitter. Furthermore, functions disclosed herein as performed by a server (such as a social networking server) may be performed by a server, a client, or a combination thereof. For example, functions performed by server-side code (e.g., server-side JavaScript) may alternatively be implemented using client-side code (e.g., client-side JavaScript) or a combination of server-side code and client-side code. Conversely, functions performed by client-side code (e.g., client-side JavaScript) may alternatively be implemented using server-side code (e.g., server-side JavaScript) or a combination of client-side code and server-side code.

Any "content" disclosed herein, such as content 116a and content 116b, may be any kind of content. For example, such content may be or include any one or more of the following in any combination: text, image, audio, video, hyperlinks, web pages or any portion thereof, messages (such as email messages, text messages, or any kind of message transmissible from one user to another user within an online social networking system), wall posts, and any kind of content that may be posted on or otherwise hosted by an online social networking system.

Any reference herein to a "product" should be understood to refer to a product and/or a service. Similarly, any reference herein to a "service" should be understood to refer to a product and/or a service.

Certain concepts described herein may be known by other names. For example, a "wall" on Facebook or other social networking system may also be referred to as a "timeline." As another example, a "wall post" on Facebook or other social networking system may also be referred to as a "story." Therefore any reference to a "wall," "wall post," or other concept that is also known by other names should be understood to refer to the concept generally, regardless of the name by which it is referred.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer-implemented method comprising:
   (A) receiving, from a first user:
      input specifying a first hyperlink; and
      input specifying data to associate with the first hyperlink, wherein the data to associate with the first hyperlink includes an image; and
   (B) generating a second hyperlink, wherein a target of the second hyperlink is a proxy web page containing metadata representing the data to associate with the first hyperlink, wherein the data to associate with the first hyperlink includes the image;

(C) receiving, from a requester, a request to serve the target of the second hyperlink; and (D) in response to the request, transmitting the proxy web page, including the metadata representing the data to associate with the first hyperlink, to the requester.

2. The method of claim 1, wherein the proxy web page comprises at least one tag.

3. The method of claim 1, further comprising:

(E) providing the second hyperlink to the first user.

4. The method of claim 1, wherein the data to associate with the first hyperlink comprises text.

5. The method of claim 1, further comprising:

(E) at the requester, manifesting the data to associate with the first hyperlink.

6. The method of claim 5, further comprising:

(F) at the requester, manifesting the first hyperlink.

7. The method of claim 1, further comprising:

(E) in response to the request, providing the first hyperlink to the requester.

8. The method of claim 1, further comprising:

(E) redirecting the requester to a target of the first hyperlink.

9. The method of claim 1, wherein the metadata comprises Open Graph Metadata (OGM) tags.

10. The method of claim 1, wherein the request comprises an HTTP GET request.

11. A non-transitory computer-readable medium comprising computer program instructions executable by a computer processor to perform a method, the method comprising:

(A) receiving, from a first user:

input specifying a first hyperlink; and input specifying data to associate with the first hyperlink, wherein the data to associate with the first hyperlink includes an image; and (B) generating a second hyperlink, wherein a proxy web page containing metadata representing the data to associate with the first hyperlink, wherein the data to associate with the first hyperlink includes the image;

(C) receiving, from a requester, a request to serve the target of the second hyperlink; and (D) in response to the request, transmitting the proxy web page, including the metadata representing the data to associate with the first hyperlink, to the requester.

12. The computer-readable medium of claim 11, wherein the proxy web page comprises at least one tag.

13. The computer-readable medium of claim 11, wherein the method further comprises:

(E) providing the second hyperlink to the first user.

14. The computer-readable medium of claim 11, wherein the data to associate with the first hyperlink comprises text.

15. The computer-readable medium of claim 11, wherein the method further comprises:

(E) at the requester, manifesting the data to associate with the first hyperlink.

16. The computer-readable medium of claim 15, wherein the method further comprises:

(F) at the requester, manifesting the first hyperlink.

17. The computer-readable medium of claim 11, wherein the method further comprises:

(E) in response to the request, providing the first hyperlink to the requester.

18. The computer-readable medium of claim 11, wherein the method further comprises:

(E) redirecting the requester to a target of the first hyperlink.

19. The computer-readable medium of claim 11, wherein the metadata comprises Open Graph Metadata (OGM) tags.

20. The computer-readable medium of claim 11, wherein the request comprises an HTTP GET request.

* * * * *

UNITED STATES PATENT AND TRADEMARK OFFICE
CERTIFICATE OF CORRECTION

| | | |
|---|---|---|
| PATENT NO. | : 9,268,750 B2 | Page 1 of 1 |
| APPLICATION NO. | : 13/856602 | |
| DATED | : February 23, 2016 | |
| INVENTOR(S) | : Mishra | |

It is certified that error appears in the above-identified patent and that said Letters Patent is hereby corrected as shown below:

In the specification,

In Column 2, Line 31, delete "invention." and insert -- invention; --, therefor.

In Column 8, Line 24, delete "hyperlink 332" and insert -- hyperlink 310 --, therefor.

In the claims,

In Column 13, Line 35, in Claim 11, delete "wherein a" and insert -- wherein a target of the second hyperlink is a --, therefor.

Signed and Sealed this
Second Day of August, 2016

Michelle K. Lee
*Director of the United States Patent and Trademark Office*